United States Patent
Bontrager et al.

(10) Patent No.: US 9,987,978 B1
(45) Date of Patent: Jun. 5, 2018

(54) VEHICLE PROJECTION SYSTEM

(71) Applicants: Dewayne Bontrager, Atlanta, GA (US);
Lawayne Bontrager, Atlanta, GA (US)

(72) Inventors: Dewayne Bontrager, Atlanta, GA (US);
Lawayne Bontrager, Atlanta, GA (US)

(73) Assignee: Twiin Media, Atlanta, GA (US)

( * ) Notice: Subject to any disclaimer, the term of this patent is extended or adjusted under 35 U.S.C. 154(b) by 0 days. days.

(21) Appl. No.: 15/366,476

(22) Filed: Dec. 1, 2016

(51) Int. Cl.
*B60Q 1/26* (2006.01)
*B60Q 1/50* (2006.01)

(52) U.S. Cl.
CPC .............. *B60Q 1/50* (2013.01); *B60Q 1/503* (2013.01); *B60Q 1/506* (2013.01)

(58) Field of Classification Search
CPC ..... B60C 1/50; B60C 2900/30; B60C 1/2611; B60C 1/52; B60C 1/503
USPC ...................... 340/464–479; 343/55, 82, 903
See application file for complete search history.

(56) References Cited

U.S. PATENT DOCUMENTS

| | | | | |
|---|---|---|---|---|
| 5,796,350 A | * | 8/1998 | Fuse | B60K 35/00 340/439 |
| 7,477,140 B1 | * | 1/2009 | Booth | B60Q 1/302 340/463 |
| 2005/0012598 A1 | * | 1/2005 | Berquist | G09F 21/04 340/425.5 |
| 2011/0018738 A1 | * | 1/2011 | Feroldi | B60Q 1/503 340/905 |
| 2014/0368324 A1 | * | 12/2014 | Seifert | G08G 1/166 340/435 |

* cited by examiner

*Primary Examiner* — George Bugg
*Assistant Examiner* — Sharmin Akhter
(74) *Attorney, Agent, or Firm* — Ballard Spahr LLP (57) ABSTRACT

Disclosed are various embodiments of a vehicle projection system. Visual content is projected from a vehicle interior into a rear projection insert. The insert can include a semi-transparent component to facilitate rear projection. The insert can also be perforated for enhanced visibility from the vehicle interior through the insert. A controller can change or modify the projected visual content based on operating conditions of the vehicle.

17 Claims, 7 Drawing Sheets

VEHICLE PROJECTION SYSTEM

BACKGROUND

Vehicles can be affixed with text or graphics for advertising purposes. As an example, advertising images may be adhered to vehicle windows. A disadvantage to this approach is that an advertiser is limited to still-frame images. Moreover, changing the displayed advertisement requires the removal of the original and the production of a new decal, which has drawbacks in both cost and time.

SUMMARY

It is to be understood that both the following general description and the following detailed description are exemplary and explanatory only and are not restrictive. Provided are methods and systems for vehicle projection system. A semitransparent insert can be inserted into a frame for a vehicle window. The insert can be adhered to a vehicle window, or cut to size so that it rests in the window frame without adhesion. A projector in the vehicle can project visual content, including image or video content, on the semitransparent insert. The projected light passes through the insert, allowing the projected content to be viewed from the vehicle exterior. The projector may be communicatively coupled to one or more sensors that alter the displayed content based on operating circumstances of the vehicle.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to a vehicle projection system for projecting visual content visible from the exterior of a vehicle. Although the following discussion sets forth visual content in the context of advertising, it is understood that the displayed visual content may extend to other uses, including entertainment or artistic purposes. Additionally, although the following discussion addresses a vehicle projection system deployed in an automobile, it is understood that this is a non-limiting example and the vehicle projection system may be deployed in other vehicles.

Vehicle exteriors may be used for advertising purposes by adhering decals or other imagery to the vehicle body. This includes perforated decals adhered to windows, as well as other decals or art adhered to the vehicle body or frame. This existing approach has several disadvantages. First, the advertising content is limited to still images, preventing more dynamic advertisements from being presented. Additionally, as the advertising content is adhered directly to the vehicle, changing the advertising content requires a complete removal of an existing advertisement. This requires substantial effort, and may result in the destruction of the removed advertisement.

A vehicle projection system allows visual content to be projected within the frame of a vehicle window. A semitransparent insert is inserted into the frame of the vehicle window. A projector internal to the vehicle projects visual content, including still images or video, on the semitransparent insert. As the insert is semitransparent, the projected visual content is visible from the outside of the vehicle. The insert can include a semitransparent perforated layer to facilitate viewing through the insert from inside the vehicle. Additionally, the semitransparent insert material can minimize the amount of projected imagery visible from the inside of the vehicle. In an aspect, the projector can be coupled to a controller to modify the projected visual content according to operating conditions of the vehicle. This can include dimming or brightening a projection, switching between static image and dynamic video projected content, applying image or text overlays, or otherwise modifying the projected visual content. Accordingly, the controller may be communicatively coupled to one or more sensors, including a motion sensor, proximity motion sensor, global positioning system radio, light sensor, or other sensor as can be appreciated. Additionally, the controller may be in communication with a mobile device, server, or other computing device to monitor projection usage and vehicle activity for tracking incentives.

Although the following figures and discussion address a vehicle projection system with respect to a rear window of a vehicle, it is understood that this is a non-limiting example, and that the vehicle projection system may be implemented using any window of a vehicle.

Figure 1:
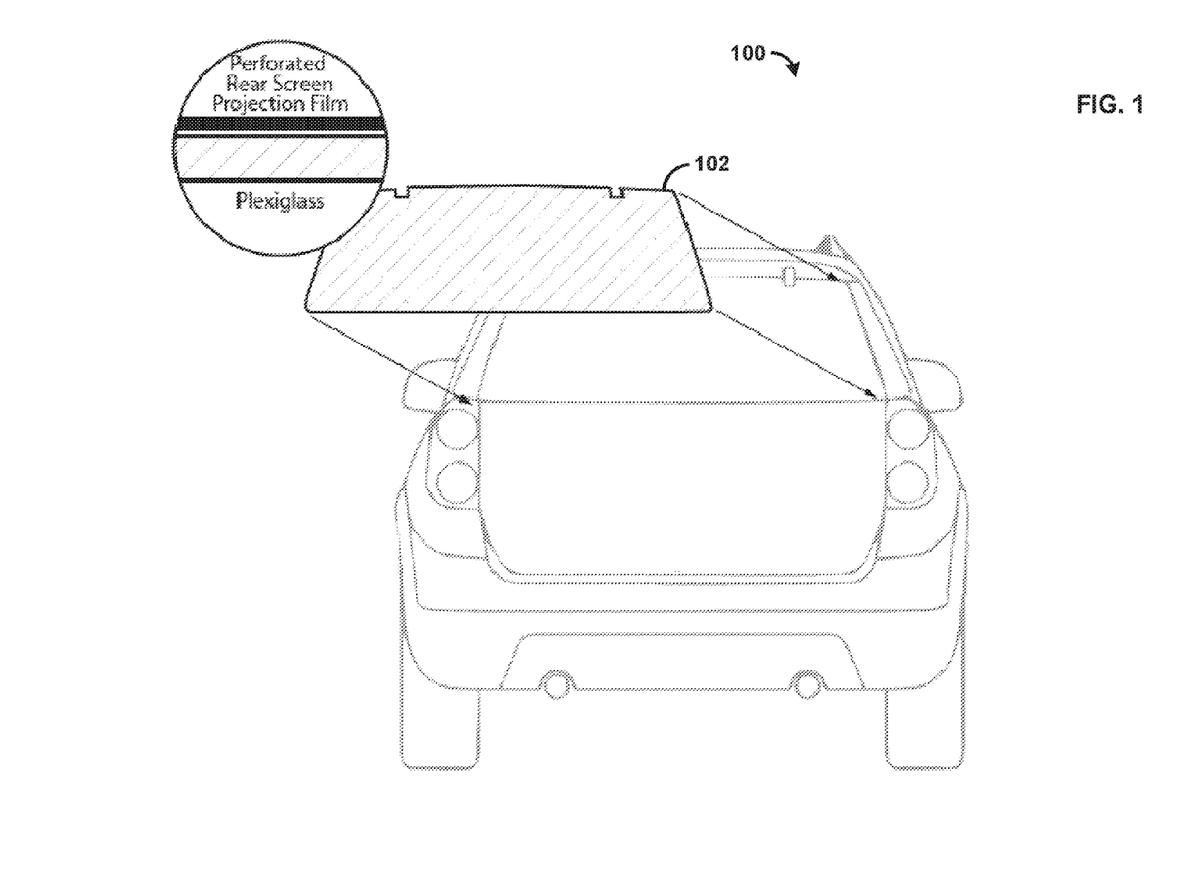
FIG. 1 is an implementation of an installation of a semitransparent insert of a vehicle projection system.

FIG. 1 illustrates an example installation portion 100 of a vehicle projection system. The disclosed installation portion 100 includes a semitransparent insert 102. The semitransparent insert allows for rear-projected light projected onto the insert 102 from the interior of the vehicle to be visible from the exterior of the vehicle. In an aspect, the insert 102 comprises plexiglass, fiberglass, plastic, or another substantially rigid material as can be appreciated. In an aspect, the insert 102 can be composed of a semitransparent material. In another aspect, the insert 102 can be composed of a transparent material layer and a semitransparent material layer. For example, the insert 102 can include a transparent plexiglass layer and a semitransparent rear screen projection film layer. In an aspect the semitransparent rear screen projection film layer is perforated to facilitate visibility from a driver or passenger of the vehicle through the insert 102. In an aspect, the insert 102 can be cut to size for fitting within a frame of a vehicle window. Thus, the window frame holds the insert 102 in place without need for adhesion. In another aspect, the insert 102 can be adhered directly to a vehicle window.

Figure 2A:
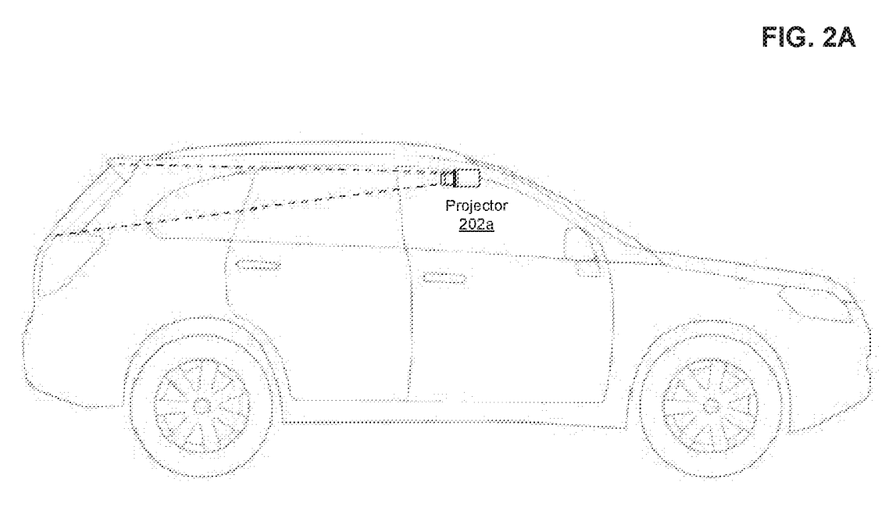
FIG. 2A is a view of an example implementation of a vehicle projection system.

FIG. 2A is a view 200 of example implementation of a vehicle projection system. Shown is a vehicle 201 with a projector 202a affixed near a front end of the vehicle 201 cabin. The projector 202a is configured to rear project light onto a insert 102.

Figure 2B:
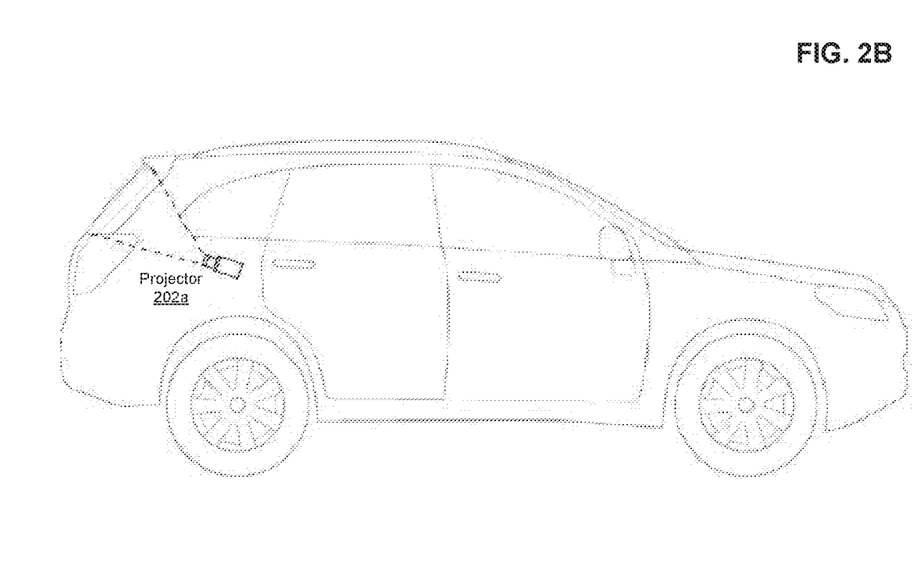
FIG. 2B is a view of an example implementation of a vehicle projection system.

FIG. 2B is another view 210 of example implementation of a vehicle projection system. Shown is a vehicle 201 with a projector 202b affixed near a rear end of the vehicle 201 cabin. The projector 202b is configured to rear project light onto a insert 102. In this example view 210, the projector 202b is a short throw projector 202b capable of focused projections over a short distance.

Figure 2C:
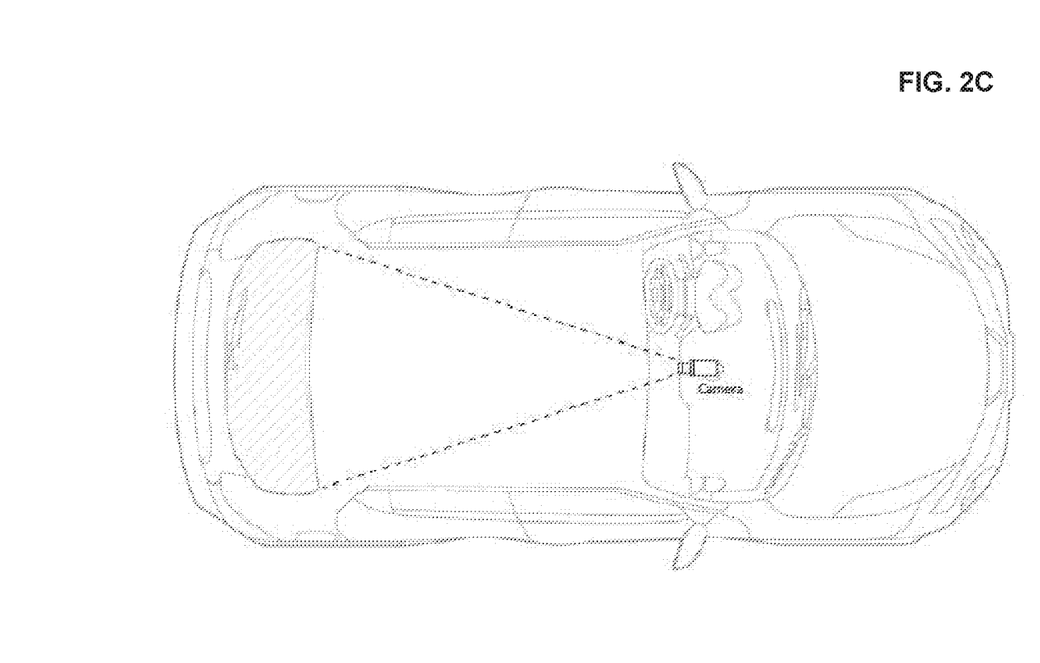
FIG. 2C is a view of an example implementation of a vehicle projection system.

FIG. 2C is another view 220 of example implementation of a vehicle projection system. In an aspect the view 220 cab correspond to an overhead view of the view 200. Shown is a vehicle 201 with a projector 202a affixed near a front end of the vehicle 201 cabin. The projector 202a is configured to rear project light onto a insert 102.

Figure 3:
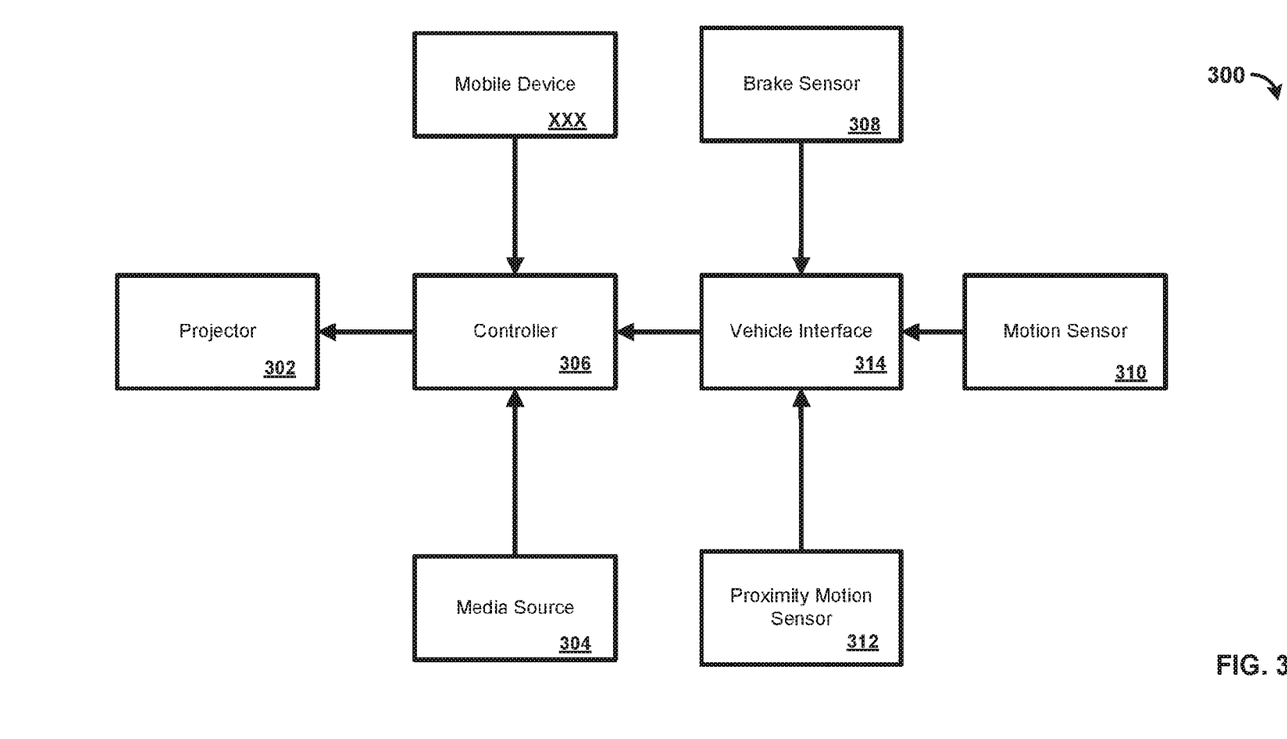
FIG. 3 is a block diagram of an example implementation of a vehicle projection system.

FIG. 3 is an example block diagram 300 for a vehicle projection system. The vehicle projection system includes a projector 302 for projecting visual content. The projector 302 can be designed for projection over a short distance onto a projection medium, i.e. a short throw projector. The projector 302 can also be designed for medium to long range projection, such as from a midpoint in a vehicle cabin or a dashboard onto a projection medium. The visual content projected by the projector 302 can be accessed from a media source 304. In an aspect, the media source 304 can include a memory, including hard drives, solid state drives, or other memory as can be appreciated. The media source 304 can be remotely located from the projector 302 and can be accessed wirelessly as will be discussed below. The media source 304 can also include a wired memory coupled to the projector, or a memory internal to the projector. Additionally, the media source 304 can include a device outputting a video signal for projection by the projector 302. Such a device can include a computing device, video disc player, or other device as can be appreciated.

The projector 302 can be coupled to a controller 306 for controlling the projection operations of the projector 302. The controller 306 can include any combination of circuitry, software, computing devices, or other components as can be appreciated. In an aspect, the controller 306 can load visual content from a media source 304 for projection. For example, the controller 306 can access a physically coupled media source 304. In another example, the controller 306 can wirelessly access a media source 304. This can include accessing a media source 304 through a personal area network. This can also include wirelessly accessing a server functioning as a media source 304.

In an aspect, the controller 306 can select visual content from the media source 304 for projection based on operating conditions of the vehicle. Accordingly, the controller 306 can access one or more sensors including a brake sensor 308, motion sensor 310, and proximity motion sensor 312. The brake sensor 308 detects whether brakes of the vehicle are currently being applied. The motion sensor 310 detects whether the vehicle is in motion. In an aspect, the motion sensor 310 can include an accelerometer. In another aspect, the motion sensor 310 can include a global positioning system (GPS) radio, with changes in GPS location indicating a vehicle in motion. In another aspect, the motion sensor 310 can include a speedometer, with a non-zero speed indicating a vehicle in motion. The controller 306 can also include a proximity motion sensor 312 detecting moving vehicles proximate to the vehicle in which the vehicle projection system is installed.

In an aspect, the controller 306 can modify a projection of the visual content by the projector 302 based on whether or not brakes are applied as indicated by the brake sensor 308. For example, the controller 306 can increase or decrease a brightness of the projection when brakes are applied. As another example, the controller 306 can apply a video, image, or text overlay when brakes are applied. The overlay can emphasize or indicate that brakes are being applied, or display other information.

The controller 306 can also modify a projection of the visual content by the projector 302 based on whether or not the vehicle is in motion as indicated by the motion sensor 310. For example, the controller 306 can select static or still image visual content for projection while the vehicle is in motion. In an aspect, the controller 306 can select dynamic or video content for projection when the vehicle is not in motion. In another aspect, the controller 306 can select static or still image visual content for projection while the vehicle is stopped and one or more proximate vehicles are detected to be in motion as indicated by the proximity motion sensor 312.

In an aspect, any combination of the brake sensor 308, motion sensor 310, and proximity motion sensor 312 may be in direct communication with the controller 306. That is, each may be communicatively coupled directly to the controller 306 by a wired or wireless interface. In another aspect, any combination of the brake sensor 308, motion sensor 310, and proximity motion sensor 312 may be components or peripheral components of the vehicle in which the vehicle projection system is deployed. Accordingly, any of the brake sensor 308, motion sensor 310, and proximity motion sensor 312 may by coupled to an onboard computing device in the vehicle accessible to the controller via a vehicle interface 314.

In an aspect, the controller 306 may also be in communication with a mobile device 316, such as a smartphone, tablet, laptop, or other computing device. In such an aspect, the mobile device 316 may serve as a media source 304 transmitting visual content to the controller 306. In another aspect, the mobile device 316 may provide a text message or image to the controller 306 for overlay on the projected visual content. Additionally, the mobile device 316 may monitor projector 302 usage, vehicle activity from the vehicle interface 314, or other activity for reporting to a central server. This aggregated data can be used, for example to calculate incentives associated with a projection of visual content during operation of a vehicle.

It is understood that the block diagram 300 is only exemplary, and that any of the depicted components could be removed and additional components may be added. Additionally, it is understood that one or more of the depicted components may be included in the same entity, or their disclosed functions performed by a same device.

Figure 4:
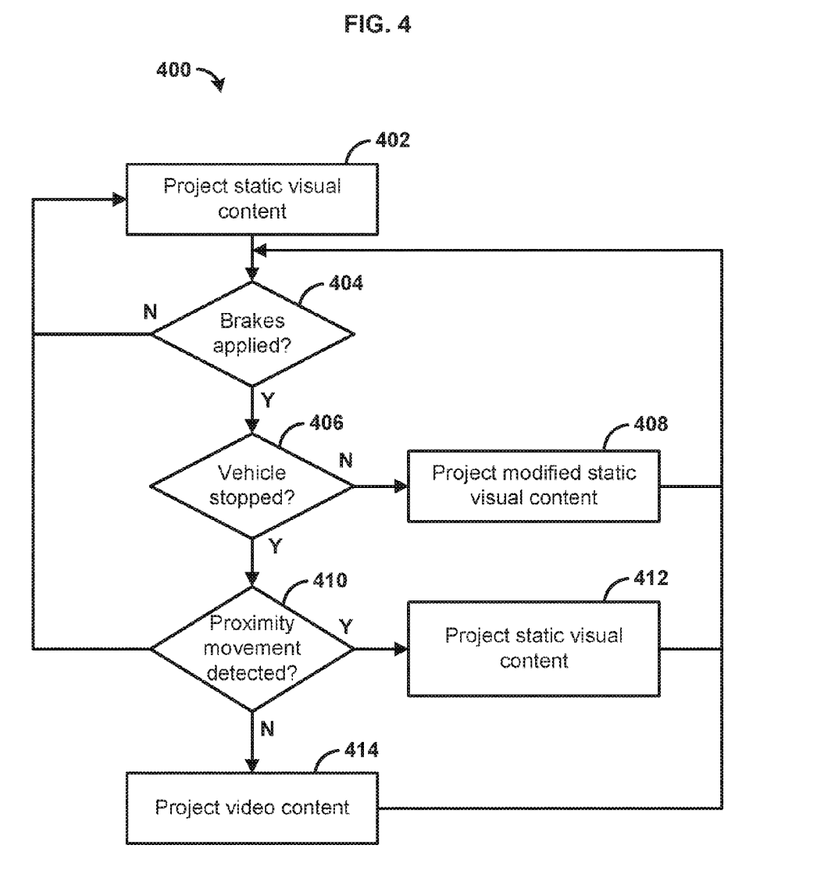
FIG. 4 is a flowchart of an example method.

FIG. 4 is a flowchart 400 of an example method. Beginning with step 402, the vehicle projection system projects static visual content via a projector 302 onto a semitransparent insert 100 in a vehicle. The static visual content can include, for example, a still image, text, or other static content. Next, in box 404, the controller 306 determines if brakes are being applied according to information from a brake sensor 308. If brakes are not being applied, the process returns to box 402 where the system continues to project static visual content. Otherwise, the process advances to step 406 where the controller determines if the vehicle is stopped according to information from a motion sensor 310.

If the vehicle is not stopped, the process advances to step 408, where the controller 306 projects modified static visual content. This can include, for example, dimming or brightening a projection of the visual content. This can also include applying a visual or text overlay to the projected visual content. The process then returns to step 404, such that the modified static visual content is projected until the vehicle comes to a full stop, as described above, or the brakes are no longer applied.

If, in step 406, it is determined that the vehicle is stopped, the process advances to step 410, where the controller 306 determines if there is proximity movement detected, i.e. are there vehicles moving within a detection proximity of a proximity motion sensor 312. If so, then the process advances to step 412 where the controller 306 projects static visual content. This static visual content can correspond to the originally projected static visual content referenced in step 402, the modified static visual content referenced in step 408, or other static visual content as can be appreciated. If no proximity movement is detected in step 410 the process advances to step 414 where the controller 306 projects video content. The process then advances back to step 404. Thus, on reaching step 414, video content will continue to be projected until the vehicle stops moving, the brakes are released, or proximity movement is detected.

Figure 5:
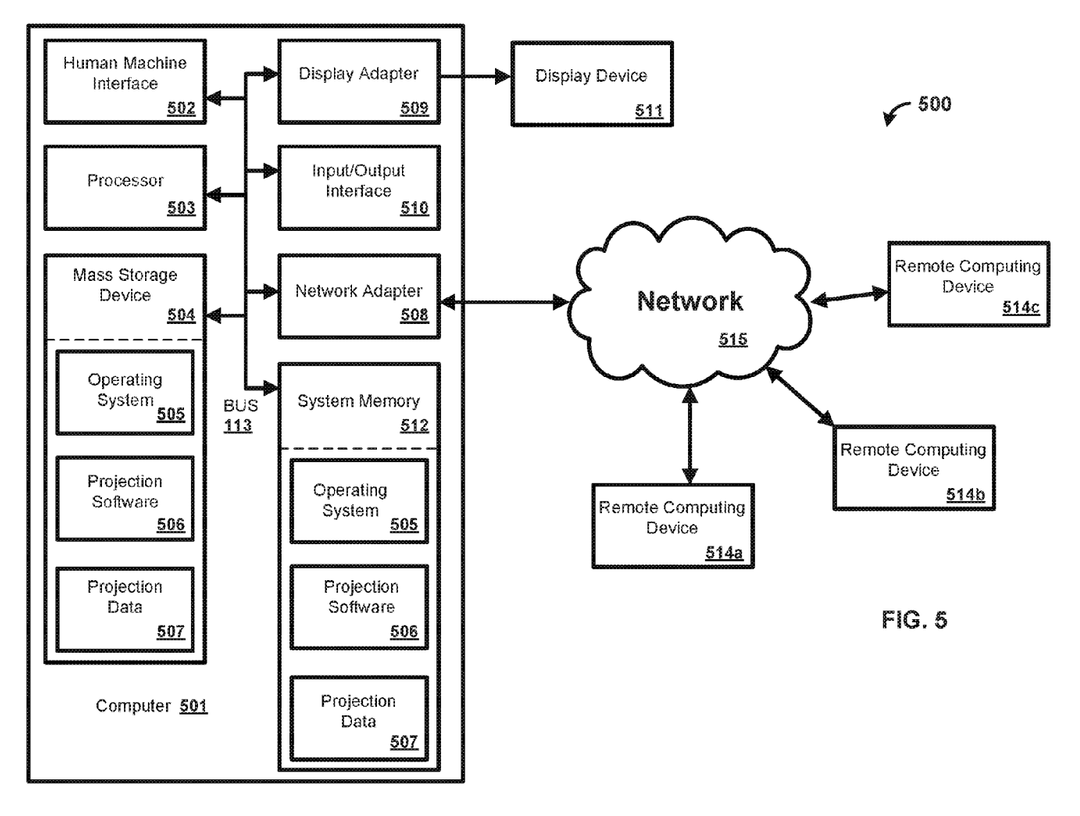
FIG. 5 is a block diagram of an example computing device in the vehicle projection system.

In an exemplary aspect, the methods and systems can be implemented on a computer 501 as illustrated in FIG. 5 and described below. By way of example, the controller 306 of FIG. 3 can be a computer as illustrated in FIG. 5. Similarly, the methods and systems disclosed can utilize one or more computers to perform one or more functions in one or more locations. FIG. 5 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors 503, a system memory 512, and a system bus 513 that couples various system components including the one or more processors 503 to the system memory 512. The system can utilize parallel computing.

The system bus 513 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 513, and all buses specified in this description can also be implemented over a wired or wireless network connection and each of the subsystems, including the one or more processors 503, a mass storage device 504, an operating system 505, projection software 506, projection data 507, a network adapter 508, the system memory 512, an Input/Output Interface 510, a display adapter 509, a display device 511, and a human machine interface 502, can be contained within one or more remote computing devices 514*a,b,c* at physically separate locations, connected through buses of this form, in effect implementing a fully distributed system. As an example, the projectors 202*a*, 202*b*, and 302 of FIGS. 2A, 2B, 2C, and 3, respectively, can be a display device 511.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 112 typically contains data such as the projection data 507 and/or program modules such as the operating system 505 and the projection software 506 that are immediately accessible to and/or are presently operated on by the one or more processors 503.

In another aspect, the computer 501 can also comprise other removable/non-removable, volatile/non-volatile computer storage media. By way of example, FIG. 5 illustrates the mass storage device 504 which can provide non-volatile storage of computer code, computer readable instructions, data structures, program modules, and other data for the computer 501. For example and not meant to be limiting, the mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, the operating system 505 and the projection software 506. Each of the operating system 505 and the projection software 506 (or some combination thereof) can comprise elements of the programming and the projection software 506. The projection data 507 can also be stored on the mass storage device 504. The projection data 507 can be stored in any of one or more databases known in the art. Examples of such databases comprise, DB2$, Microsoft® Access, Microsoft® SQL Server, Oracle*, mySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 503 via the human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, the display device 511 can also be connected to the system bus 513 via an interface, such as the display adapter 509. It is contemplated that the computer 501 can have more than one display adapter 509 and the computer 501 can have more than one display device 511. For example, the display device 511 can be a monitor, an LCD (Liquid Crystal Display), or a projector. For example, the display device 511 can include an LCD display shaped to fit within a frame of a vehicle window. In such an aspect, video content can be displayed according to the aspects described above, but using the LCD display in place of a projector and semitransparent insert. In addition to the display device 511, other output peripheral devices can comprise components such as speakers (not shown) and a printer (not shown) which can be connected to the computer 501 via the Input/Output Interface 510. Any step and/or result of the methods can be output in any form to an output device. Such output can be any form of visual representation, including, but not limited to, textual, graphical, animation, audio, tactile, and the like. The display device 511 and computer 501 can be part of one device, or separate devices.

The computer 501 can operate in a networked environment using logical connections to one or more remote computing devices 514a,b,c. By way of example, a remote computing device can be a personal computer, portable computer, smartphone, a server, a router, a network computer, a peer device or other common network node, and so on. Logical connections between the computer 501 and a remote computing device 514a,b,c can be made via a network 515, such as a local area network (LAN) and/or a general wide area network (WAN). Such network connections can be through the network adapter 508. The network adapter 508 can be implemented in both wired and wireless environments. Such networking environments are conventional and commonplace in dwellings, offices, enterprise-wide computer networks, intranets, and the Internet.

For purposes of illustration, application programs and other executable program components such as the operating system 505 are illustrated herein as discrete blocks, although it is recognized that such programs and components reside at various times in different storage components of the computing device 501, and are executed by the one or more processors 503 of the computer. An implementation of the projection software 506 can be stored on or transmitted across some form of computer readable media. Any of the disclosed methods can be performed by computer readable instructions embodied on computer readable media Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. An apparatus comprising:
   a perforated semitransparent insert shaped for insertion into a frame of a window of a vehicle; and
   a projector configured to:
   receive an indication of the motion of the vehicle from a speedometer communicatively coupled to the projector;
   project visual content onto the perforated semitransparent insert based on the indication of the motion by:
   displaying a still image in response to the vehicle being stopped and detecting another vehicle in motion; and
   displaying video content in response to the vehicle being stopped and not detecting another vehicle in motion.

2. The apparatus of claim 1, wherein the visual content comprises video content.

3. The apparatus of claim 1, wherein the projector is configured to display a still image in response to the vehicle being in motion.

4. The apparatus of claim 1, wherein the perforated semitransparent insert comprises plexiglass.

5. The apparatus of claim 1, wherein the perforated semitransparent insert is unadhered to the window of the vehicle.

6. The apparatus of claim 1, wherein the perforated semitransparent insert is adhered to the window of the vehicle.

7. An apparatus comprising:
an insert shaped for insertion into a frame of a window of a vehicle;
a projector configured to project visual content onto the semitransparent insert; and
a global positioning system radio communicatively coupled to the projector; and wherein the projector is configured:
  determine the visual content projected onto the semitransparent insert based on an indication of movement of the vehicle received from at the global positioning system radio by:
    displaying a still image in response to the vehicle being stopped and detecting another vehicle in motion; and
    displaying video content in response to the vehicle being stopped and not detecting another vehicle in motion.

8. The apparatus of claim 7, wherein the projector is configured to dim a projection of the visual content in response to a movement of the vehicle.

9. The apparatus of claim 7, wherein the projector is configured to determine the visual content projected onto the semitransparent insert further based on a braking status of the vehicle.

10. The apparatus of claim 9, wherein the projector is configured to dim a projection of the visual content in response to a braking of the vehicle.

11. The apparatus of claim 9, wherein the projector is configured to display an overlay on the visual content in response to a braking of the vehicle.

12. The apparatus of claim 9, further comprising a mobile device in communication with the projector.

13. The apparatus of claim 12, wherein the projector is configured to display, on the visual content, an overlay received from the mobile device.

14. The apparatus of claim 12, wherein the projector is configured to receive the visual content from the mobile device.

15. The apparatus of claim 12, wherein the mobile device is configured to monitor an amount of time of the visual content is displayed.

16. The apparatus of claim 15, wherein the mobile device is configured to track an incentive accrued based on the amount of time the visual content is displayed.

17. The apparatus of claim 13, wherein the projector is configured to receive the visual content from the mobile device.

\* \* \* \* \*